United States Patent
Gu et al.

(10) Patent No.: US 8,976,019 B2
(45) Date of Patent: Mar. 10, 2015

(54) HUMAN TUMBLE DETECTING AND ALARMING DEVICE

(75) Inventors: Rongxiang Gu, Xi'an (CN); Yongping Yuan, Xi'an (CN); Shuxing Lin, Xi'an (CN); Yongge He, Xi'an (CN)

(73) Assignee: Xi'an Chinastar M & C Limited, Xi'an, Shaanxi (CN)

( * ) Notice: Subject to any disclaimer, the term of this patent is extended or adjusted under 35 U.S.C. 154(b) by 0 days.

(21) Appl. No.: 13/992,734

(22) PCT Filed: Jul. 23, 2012

(86) PCT No.: PCT/CN2012/079060
§ 371 (c)(1),
(2), (4) Date: Jun. 8, 2013

(87) PCT Pub. No.: WO2013/044673
PCT Pub. Date: Apr. 4, 2013

(65) Prior Publication Data
US 2014/0197945 A1   Jul. 17, 2014

(30) Foreign Application Priority Data
Sep. 29, 2011 (CN) .................. 2011 2 0377067 U

(51) Int. Cl.
G08B 1/08 (2006.01)
G08B 23/00 (2006.01)
G08B 21/04 (2006.01)

(52) U.S. Cl.
CPC .......... *G08B 21/0446* (2013.01); *G08B 21/043* (2013.01)
USPC ............... 340/539.11; 340/573.1; 340/573.7; 340/539.12; 340/539.14

(58) Field of Classification Search
None
See application file for complete search history.

(56) References Cited

U.S. PATENT DOCUMENTS

| | | | | |
|---|---|---|---|---|
| 6,819,247 | B2 * | 11/2004 | Birnbach et al. | 340/573.1 |
| 7,127,370 | B2 * | 10/2006 | Kelly et al. | 702/151 |
| 8,591,411 | B2 * | 11/2013 | Banet et al. | 600/300 |
| 8,727,977 | B2 * | 5/2014 | Banet et al. | 600/300 |
| 2007/0112287 | A1 * | 5/2007 | Fancourt et al. | 600/595 |
| 2008/0253583 | A1 * | 10/2008 | Goldstein et al. | 381/92 |
| 2010/0298650 | A1 * | 11/2010 | Moon et al. | 600/301 |
| 2012/0229248 | A1 * | 9/2012 | Parshionikar et al. | 340/3.1 |
| 2013/0021152 | A1 * | 1/2013 | Vock et al. | 340/539.11 |
| 2013/0021154 | A1 * | 1/2013 | Solomon et al. | 340/539.12 |
| 2013/0178718 | A1 * | 7/2013 | Tran et al. | 600/301 |
| 2013/0300559 | A1 * | 11/2013 | Chien et al. | 340/539.12 |
| 2013/0307685 | A1 * | 11/2013 | Sholder | 340/539.12 |

* cited by examiner

*Primary Examiner* — Julie Lieu

(57) ABSTRACT

A human tumble detecting and alarming device includes an external shell body, a sensor module for detecting body postures of an object to be detected in real time, a data processing module for analyzing information detected by the sensor module and judging whether the detected object tumbles or not according to analyzing results, a wireless communicating module connected to the data processing module and a power source module for respectively supplying the sensor module, the data processing module and the wireless communicating module with electricity. The sensor module is a triaxial acceleration sensor. The sensor module, the data processing module, the wireless communicating module and the power source module are all provided within the external shell body. The human tumble detecting and alarming device is simple in structure, small-sized, portable and easy to operate.

2 Claims, 3 Drawing Sheets

HUMAN TUMBLE DETECTING AND ALARMING DEVICE

CROSS REFERENCE OF RELATED APPLICATION

This is a U.S. National Stage under 35 U.S.C 371 of the International Application PCT/CN2012/079060, filed Jul. 23, 2012, which claims priority under 35 U.S.C. 119(a-d) to CN 201120377067.9, filed Sep. 29, 2011.

BACKGROUND OF THE PRESENT INVENTION

1. Field of Invention

The present invention relates to a technical field of human tumble detection, and more particularly to a human tumble detecting and alarming device.

2. Description of Related Arts

The conventional human tumble detecting devices are divided into the following three types comprising the human tumble detecting devices respectively based on videos, acoustics and wearable sensors. The human tumble detecting device based on the videos requires installing cameras within a certain monitoring area to take pictures of human body activities and then judges whether tumble occurs or not via an image processing method. The human tumble detecting device based on the acoustics judges whether tumble occurs or not via analyzing audio signals when human body tumbles. The human tumble detecting device based on the wearable sensors detects activity states of a person who wears correspondent detecting devices and accordingly judges whether the person tumbles or not. However, in practical usage, the conventional human tumble detecting device based on the wearable sensors turns out to have many defects and disadvantages comprising a relatively big size, inconvenience in wearing, relatively few product functions, mostly the local area network as the communications network and no remote wireless communications function.

SUMMARY OF THE PRESENT INVENTION

An object of the present invention is to overcome the above disadvantages of the conventional arts and provide a human tumble detecting and alarming device which is simple, small, portable and easy to operate and has a good performance and a wireless communications function, so as to effectively avoid the defects and the disadvantages of the conventional human tumble detecting device based on the wearable sensors comprising the relatively big size, the inconvenience in wearing, the relatively few product functions, mostly the local area network as the communications network and no remote wireless communications function.

Accordingly, in order to accomplish the above object, the present invention adopts following technical solutions. A human tumble detecting and alarming device, comprises an external shell body, a sensor module for detecting body postures of an object to be detected in real time, a data processing module for analyzing information detected by the sensor module and judging whether the detected object tumbles or not according to analyzing results, a wireless communicating module connected to the data processing module and a power source module for respectively supplying the sensor module, the data processing module and the wireless communicating module with electricity, wherein the sensor module comprises a triaxial acceleration sensor. The sensor module, the data processing module, the wireless communicating module and the power source module are all provided within the external shell body. The sensor module is connected to the data processing module; and the power source module is respectively connected to the sensor module, the data processing module and the wireless communicating module.

The external shell body of the human tumble detecting and alarming device of the present invention comprises a cubic shell body and an installing element provided on the cubic shell body.

The wireless communicating module of the human tumble detecting and alarming device of the present invention comprises a GSM wireless communicating module.

The data processing module of the human tumble detecting and alarming device of the present invention comprises a data processor, and an alarming and indicating unit and an alarm-canceling circuit which are respectively connected to the data processor.

The data processor of the human tumble detecting and alarming device of the present invention comprises a single chip microcomputer (SCM) MSP430F247.

In the human tumble detecting and alarming device of the present invention, the triaxial acceleration sensor has three signal outputting terminals respectively connected to a first pin P6.1/A1, a second pin P6.2/A2 and a third pin P6.3/A3 of the SCM MSP430F247; a fourth pin P5.2/UCB1SOMI/UCB1SCL, a fifth pin P3.7/UCA1RXD/UCA1SOMI and a sixth pin P3.6/UCA1TXD/UCA1SIMO of the SCM MSP430F247 are respectively connected to a first pin PWR-KEY, a second pin TXD and a third pin RXD of the GSM wireless communicating module.

In the human tumble detecting and alarming device of the present invention, the data processing module further comprises a first operational amplifier U7B, a second operational amplifier U8A and a third operational amplifier U8B, wherein the three signal outputting terminals of the triaxial acceleration sensor are respectively connected to the first pin P6.1/A1, the second pin P6.2/A2 and the third pin P6.3/A3 of the SCM MSP430F247 respectively via the first operational amplifier U7B, the second operational amplifier U8A and the third operational amplifier U8B; the alarming and indicating unit comprises a buzzer alarming circuit and a light indicating circuit, wherein the buzzer alarming circuit comprises a buzzer LS1, a first resistor R5, a second resistor R8 and a field effect transistor (FET) Q3. In the human tumble detecting and alarming device of the present invention, a seventh pin P3.3/UCB0CLK/UCA0STE of the SCM MSP430F247 is connected to a gate electrode of the FET Q3 via the first resistor R5; the gate electrode of the FET Q3 is connected to ground via the second resistor R8 and a source electrode of the FET Q3 is also connected to ground; a drain electrode of the FET Q3 is connected to the buzzer LS1; and the light indicating circuit comprises a LED light emitting diode D2, wherein an eighth pin P3.2/UCB0SOMI/UCA0SCL of the SCM MSP430F247 is connected to a cathode of the LED light emitting diode D2 and an anode of the LED light emitting diode D2 is connected to a power source terminal AVCC via a third resistor R4.

The triaxial acceleration sensor of the human tumble detecting and alarming device of the present invention is an acceleration sensor ADXL325.

The power source module of the human tumble detecting and alarming device of the present invention comprises a powering battery and a DC/DC power source converting module connected to the powering battery, wherein the powering battery is respectively connected to the sensor module, the data processing module and the wireless communicating module via the DC/DC power source converting module.

Compared to the conventional arts, the human tumble detecting and alarming device of the present invention has following advantages.

Firstly, the human tumble detecting and alarming device is simple in structure, reasonably designed, small in size, good-looking and easy to carry and wear.

Secondly, the GSM wireless communicating module is adopted to synchronously transmit alarm information and thus the human tumble detecting and alarming device adopts a GSM network as a communications manner and accomplishes tumble alarming via text messages. The GSM network has realized nationwide networking and roaming, so the human tumble detecting and alarming device of the present invention has a strong network capability, a function of bi-directional data transmission, stable and reliable performance, low charges and other merits.

Thirdly, besides easy operations, a low cost and good performance, the human tumble detecting and alarming device is powered by batteries, fully functional and has a wireless communications function. In practical usage, via detecting acceleration vector signals at three orthogonal directions in an individual moving process of an object who wears the device of the present invention, the human tumble detecting and alarming device of the present invention senses a change of body postures of the object and accomplishes tumble alarming via text messages in a cooperation with the conventional GSM network, so as to have an capability to accomplish intelligently monitoring.

Fourthly, the human tumble detecting and alarming device has a wide application field and is widely applied in houses and hospitals to accomplish effective human tumble detection and alarm. The human tumble detecting and alarming device of the present invention is suitable for the elderly and children having relatively poor self-care abilities and self-protection abilities.

Thus the human tumble detecting and alarming device of the present invention is simple, small, portable and easy to operate and has a good performance and a wireless communications function, so as to effectively avoid the defects and the disadvantages of the conventional human tumble detecting device based on the wearable sensors comprising the relatively big size, the inconvenience in wearing, the relatively few product functions, mostly the local area network as the communications network and no remote wireless communications function.

These and other objectives, features, and advantages of the present invention will become apparent from the following detailed description, the accompanying drawings, and the appended claims.

1—sensor module; 2—data processing module; 2-1—data processor; 2-2—alarming and indicating unit; 2-3—alarm-canceling circuit; 3—wireless communicating module; 4—power source module; 5—cubic shell body; 6—installing element.

DETAILED DESCRIPTION OF THE PREFERRED EMBODIMENT

Figure 1:
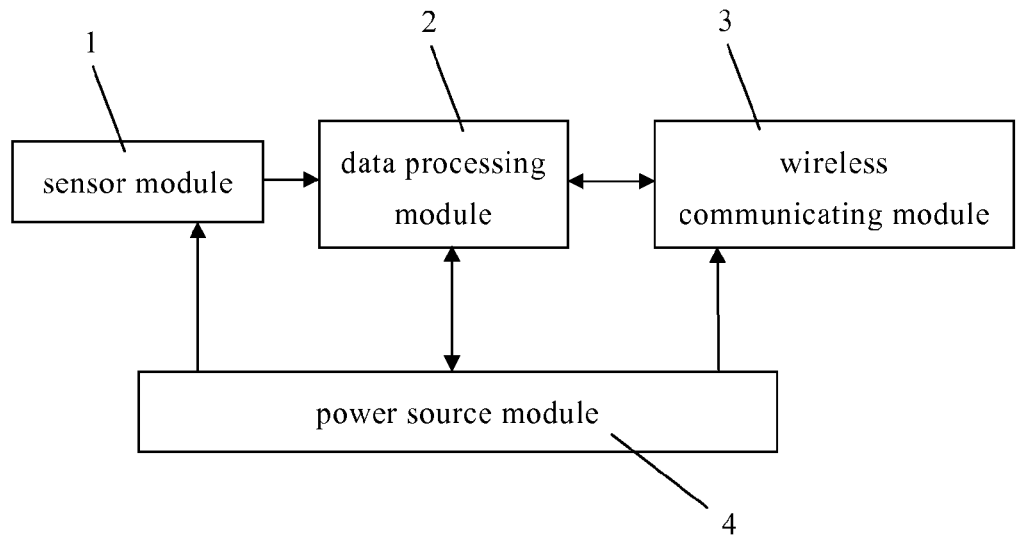
FIG. 1 is a block diagram of a circuit of a human tumble detecting and alarming device according to a preferred embodiment of the present invention.
Figure 4:
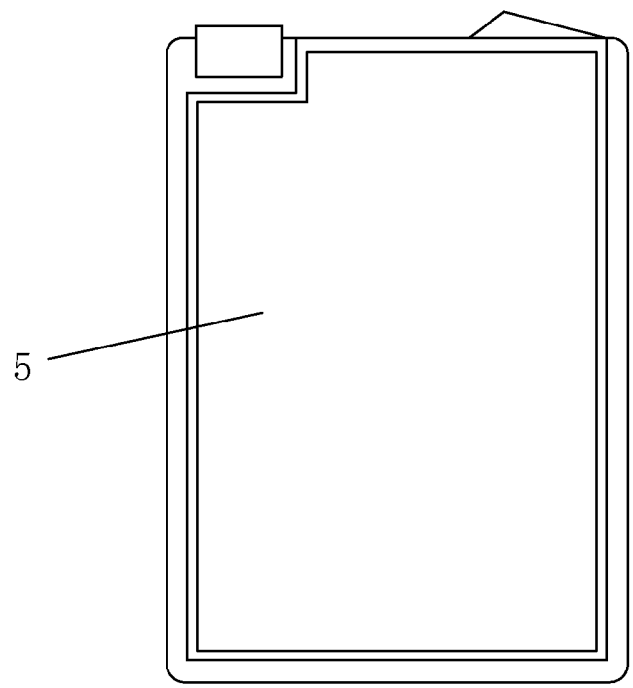
FIG. 4 is a sketch view of an external shell body of the human tumble detecting and alarming device according to the preferred embodiment of the present invention.
Figure 5:
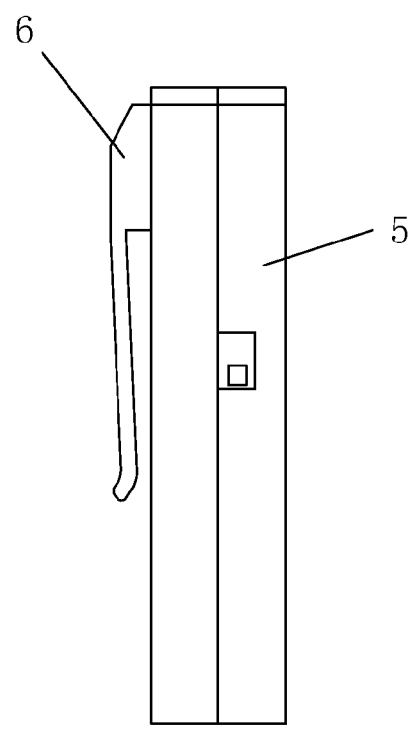
FIG. 5 is a left view of FIG. 4.

Referring to FIGS. 1, 4 and 5 of the drawings, according to a preferred embodiment of the present invention, a human tumble detecting and alarming device comprises an external shell body, a sensor module 1 for detecting body postures of an object to be detected in real time, a data processing module 2 for analyzing information detected by the sensor module 1 and judging whether the detected object tumbles or not according to analyzing results, a wireless communicating module 3 connected to the data processing module 2 and a power source module 4 for respectively supplying the sensor module 1, the data processing module 2 and the wireless communicating module 3 with electricity, wherein the sensor module 1 comprises a triaxial acceleration sensor. The sensor module 1, the data processing module 2, the wireless communicating module 3 and the power source module 4 are all provided within the external shell body. The sensor module 1 is connected to the data processing module 2; and the power source module 4 is respectively connected to the sensor module 1, the data processing module 2 and the wireless communicating module 3.

According to the preferred embodiment of the present invention, the external shell body comprises a cubic shell body 5 and an installing element 6 provided on the cubic shell body 5, in such a manner that the detected object is able to simply and conveniently wear the human tumble detecting and alarming device of the present invention via the installing element 6 in a practical using process.

According to the preferred embodiment of the present invention, the wireless communicating module 3 is a GSM wireless communicating module. The wireless communicating module 3 can also be other type of wireless communicating module.

Figure 2:
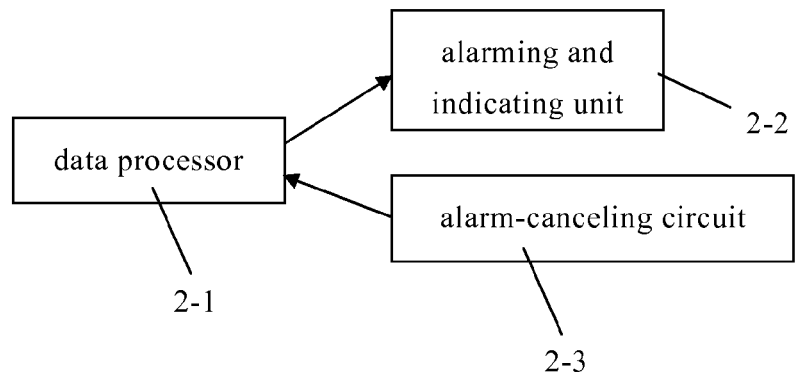
FIG. 2 is a block diagram of a circuit of a data processing module of the human tumble detecting and alarming device according to the preferred embodiment of the present invention.
Figure 3:
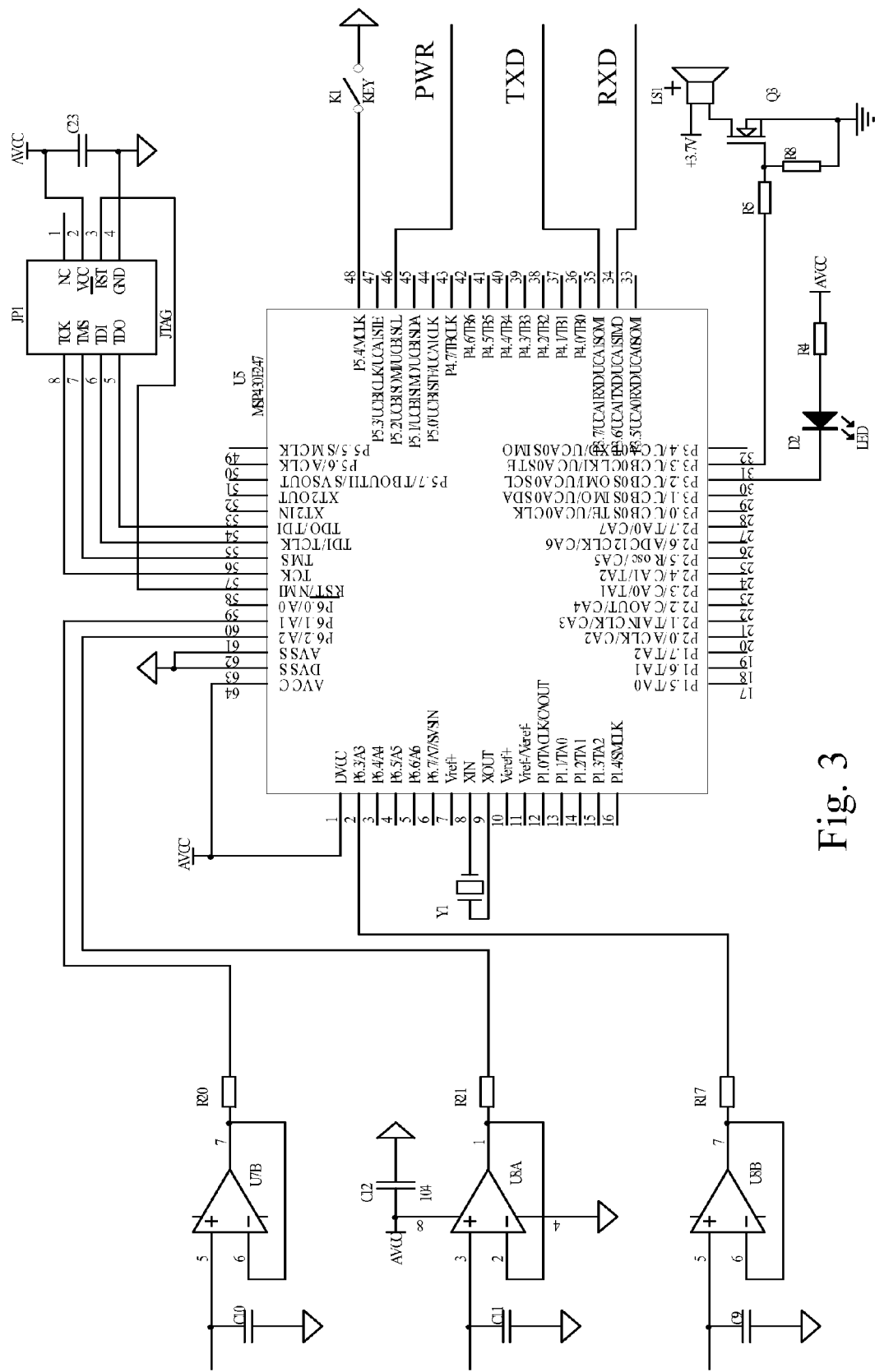
FIG. 3 is a circuit diagram of the data processing module of the human tumble detecting and alarming device according to the preferred embodiment of the present invention.

Referring to FIGS. 2 and 3, the data processing module 2 comprises a data processor 2-1, and an alarming and indicating unit 2-2 and an alarm-canceling circuit 2-3 respectively connected to the data processor 2-1. According to the preferred embodiment of the present invention, the data processor 2-1 is a SCM MSP430F247. The GSM wireless communicating module is embodied as an SIM900 wireless communicating module.

Accordingly, the human tumble detecting and alarming device comprises following connections. Three signal outputting terminals of the triaxial acceleration sensor are respectively connected to a first pin P6.1/A1, a second pin P6.2/A2 and a third pin P6.3/A3 of the SCM MSP430F247; and a fourth pin P5.2/UCB1SOMI/UCB1SCL, a fifth pin P3.7/UCA1RXD/UCA1SOMI and a sixth pin P3.6/UCA1TXD/UCA1SIMO of the SCM MSP430F247 are respectively connected to a first pin PWRKEY, a second pin TXD, a third pin RXD of the GSM wireless communicating module.

Moreover, the data processing module 2 further comprises a first operational amplifier U7B, a second operational amplifier U8A and a third operational amplifier U8B, wherein the three signal outputting terminals of the triaxial acceleration sensor are respectively connected to the first pin P6.1/A1, the second pin P6.2/A2 and the third pin P6.3/A3 of the SCM MSP430F247 respectively via the first operational amplifier U7B, the second operational amplifier U8A and the third operational amplifier U8B.

According to the preferred embodiment of the present invention, the triaxial acceleration sensor is an acceleration sensor ADXL325. A first outputting terminal XOUT of the acceleration sensor ADXL325 is connected to a non-inverting inputting terminal of the first operational amplifier U7B; a non-inverting outputting terminal of the first operational amplifier U7B is connected to ground via a first capacitor C10 and an inverting inputting terminal of the first operational amplifier U7B is connected to an outputting terminal of the first operational amplifier U7B; and the outputting terminal of the first operational amplifier U7B is connected to first pin P6.1/A1 of the SCM MSP430F247 via a fourth resistor R20. A second outputting terminal YOUT of the acceleration sensor ADXL325 is connected to a non-inverting inputting terminal of the second operational amplifier U8A; an inverting outputting terminal of the second operational amplifier U8A is connected to ground via a second capacitor C11 and an inverting inputting terminal of the second operational amplifier U8A is connected to an outputting terminal of the second operational amplifier U8A; the outputting terminal of the second operational amplifier U8A is connected to the second pin P6.2/A2 of the SCM MSP430F247 via a fifth resistor R21; and a power source terminal of the second operational amplifier U8A is connected to an power source terminal AVCC and connected to ground via a third capacitor C12. A third outputting terminal ZOUT of the acceleration sensor ADXL325 is connected to a non-inverting inputting terminal of the third operational amplifier U8B; a non-inverting outputting terminal of the third operational amplifier U8B is connected to ground via a fourth capacitor C9 and an inverting inputting terminal of the third operational amplifier U8B is connected to an outputting terminal of the third operational amplifier U8B; and the outputting terminal of the first operational amplifier U8B is connected to the third pin P6.3/A3 of the SCM MSP430F247 via a sixth resistor R17.

According to the preferred embodiment of the present invention, the alarming and indicating unit 2-2 comprises a buzzer alarming circuit and a light indicating circuit. The buzzer alarming circuit comprises a buzzer LS1, a first resistor R5, a second resistor R8 and a FET Q3. A seventh pin P3.3/UCB0CLK/UCA0STE of the SCM MSP430F247 is connected to a gate electrode of the FET Q3 via the first resistor R5; the gate electrode of the FET Q3 is connected to ground via the second resistor R8 and a source electrode of the FET Q3 is also connected to ground; a drain electrode of the FET Q3 is connected to the buzzer LS1; and the light indicating circuit comprises a LED light emitting diode D2, wherein an eighth pin P3.2/UCB0SOMI/UCA0SCL of the SCM MSP430F247 is connected to a cathode of the LED light emitting diode D2 and an anode of the LED light emitting diode D2 is connected to a power source terminal AVCC via a third resistor R4. The alarm-canceling circuit 2-3 is embodied as a press button K1 and a ninth pin P5.4/MCLK of the SCM MSP430F247 is connected to ground via the press button K1.

The power source module 4 comprises a powering battery and a DC/DC power source converting module connected to the powering battery. The powering battery is respectively connected to the sensor module 1, the data processing module 2 and the wireless communicating module 3 via the DC/DC power source converting module. Two outputting terminals of the DC/DC power source converting module comprise a first outputting terminal AVCC and a second outputting terminal AGND; and a voltage of the powering battery is converted by the DC/DC power source converting module into an AVCC voltage required by the first sensor module 1, the data processing module 2 and the wireless communicating module 3.

Besides, the data processing module 2 further comprises a program downloading port JTAG connected to the SCM MSP430F247. A tenth pin TCK, an eleventh pin TMS, a twelfth pin TDI/TCLK and a fourth pin TDO/TDI of the SCM MSP430F247 are respectively connected to a first pin TCK, a second pin TMS, a third pin TDI and a fourth pin TDO of the program downloading port JTAG. A thirteenth pin RST/NMI of the SCM MSP430F247 is connected to a fifth pin RST of the program downloading port JTAG; a sixth pin VCC of the program downloading port JTAG is connected to the power source terminal AVCC and connected to ground via a fifth capacitor C23.

Practically, the sensor module 1 detects the body postures of the detected object, and specifically acceleration vectors at three orthogonal directions in an individual moving process of the detected object, in real time and synchronously uploads detection results into the data processing module 2. During a process of uploading the detection results, the first operational amplifier U7B, the second operational amplifier U8A and the third operational amplifier U8B convert three channels of signals outputted by the sensor module 1 into signals which are acceptable for the SCM MSP430F247 and directly send the signals into the SCM MSP430F247. The SCM MSP430F247 analyzes data detected by the sensor module 1, judges the body postures of the detected object according to analyzing results and controls alarming and distributing alarm information according to judging results. Practically, the alarm-canceling circuit 2-3 is for canceling an alarming state of the buzzer alarming circuit of the alarming and indicating unit 2-2; the buzzer alarming circuit is controlled by the SCM MSP430F247, wherein the alarm occurs when the SCM MSP430F247 obtains the judging result that the detected object tumbles and before the alarm-canceling circuit 2-3 cancels alarming; and the light indicating circuit of the alarming and indicating unit 2-2 is for indicating an insufficient electricity supply from the powering battery, specifically indicating the insufficient electricity for uses when the powering battery has low power. The SCM MSP430F247 collects, analyzes and judges the data detected by the sensor module 1; and when the SCM MSP430F247 obtains the judging result that the tumble occurs, the SCM MSP430F247 sends out a 15-second-long warning tone via controlling the buzzer alarming circuit, wherein, during a process of alarming, the users are able to cancel the alarming by touching the press button K1.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A human tumble detecting and alarming device, comprising an external shell body, a sensor module for detecting body postures of an object to be detected in real time, a data processing module for analyzing information detected by said sensor module and judging whether the detected object tumbles or not according to an analyzing result, a wireless communicating module connected to said data processing module and a power source module for respectively supplying said sensor module, said data processing module and said wireless communicating module with electricity, wherein said sensor module is a triaxial acceleration sensor; said sensor module, said data processing module, said wireless communicating module and said power source module are all provided within said external shell body; said sensor module is connected to said data processing module; and said power source module is respectively connected to said sensor module, said data processing module and said wireless communicating module;

wherein said wireless communicating module is a GSM wireless communicating module;

wherein said data processing module comprises a data processor and an alarming and indicating unit and an alarm-canceling circuit respectively connected to said data processor;

wherein said data processor is an SCM MSP430F247;

wherein three signal outputting terminals of said triaxial acceleration sensor are respectively connected to a first pin P6.1/A1, a second pin P6.2/A2 and a third pin P6.3/A3 of said SCM MSP430F247; and a fourth pin P5.2/UCB1SOMI/UCB1SCL, a fifth pin P3.7/UCA1RXD/UCA1SOMI and a sixth pin P3.6/UCA1TXD/UCA1SIMO of said SCM MSP430F247 are respectively connected to a first pin PWRKEY, a second pin TXD and a third pin RXD of said GSM wireless communicating module; and wherein said data processing module further comprises a first operational amplifier, a second operational amplifier and a third operational amplifier, wherein said three signal outputting terminals of said triaxial acceleration sensor are respectively connected to said first pin P6.1/A1, said second pin P6.2/A2 and said third pin P6.3/A3 of the SCM MSP430F247 respectively via said first operational amplifier, said second operational amplifier and said third operational amplifier; said alarming and indicating unit comprises a buzzer alarming circuit and a light indicating circuit, wherein said buzzer alarming circuit comprises a buzzer, a first resistor, a second resistor and an FET; a seventh pin P3.3/UCB0CLK/UCA0STE of said SCM MSP430F247 is connected to a gate electrode of said FET via said first resistor; said gate electrode of said FET is connected to ground via said second resistor and a source electrode of said FET is also connected to ground; a drain electrode of said FET is connected to said buzzer; and said light indicating circuit comprises a LED light emitting diode, wherein an eighth pin P3.2/UCB0SOMI/UCA0SCL of said SCM MSP430F247 is connected to a cathode of said LED light emitting diode and an anode of the LED light emitting diode is connected to a power source terminal via a third resistor.

2. A human tumble detecting and alarming device, comprising an external shell body, a sensor module for detecting body postures of an object to be detected in real time, a data processing module for analyzing information detected by said sensor module and judging whether the detected object tumbles or not according to an analyzing result, a wireless communicating module connected to said data processing module and a power source module for respectively supplying said sensor module, said data processing module and said wireless communicating module with electricity, wherein said sensor module is a triaxial acceleration sensor; said sensor module, said data processing module, said wireless communicating module and said power source module are all provided within said external shell body; said sensor module is connected to said data processing module; and said power source module is respectively connected to said sensor module, said data processing module and said wireless communicating module;

wherein said external shell body comprises a cubic shell body and an installing element provided on said cubic shell body;

wherein said wireless communicating module is a GSM wireless communicating module;

wherein said data processing module comprises a data processor and an alarming and indicating unit and an alarm-canceling circuit respectively connected to said data processor;

wherein said data processor is an SCM MSP430F247;

wherein three signal outputting terminals of said triaxial acceleration sensor are respectively connected to a first pin P6.1/A1, a second pin P6.2/A2 and a third pin P6.3/A3 of said SCM MSP430F247; and a fourth pin P5.2/UCB1SOMI/UCB1SCL, a fifth pin P3.7/UCA1RXD/UCA1SOMI and a sixth pin P3.6/UCA1TXD/UCA1SIMO of said SCM MSP430F247 are respectively connected to a first pin PWRKEY, a second pin TXD and a third pin RXD of said GSM wireless communicating module; and wherein said data processing module further comprises a first operational amplifier, a second operational amplifier and a third operational amplifier, wherein said three signal outputting terminals of said triaxial acceleration sensor are respectively connected to said first pin P6.1/A1, said second pin P6.2/A2 and said third pin P6.3/A3 of the SCM MSP430F247 respectively via said first operational amplifier, said second operational amplifier and said third operational amplifier; said alarming and indicating unit comprises a buzzer alarming circuit and a light indicating circuit, wherein said buzzer alarming circuit comprises a buzzer, a first resistor, a second resistor and an FET; a seventh pin P3.3/UCB0CLK/UCA0STE of said SCM MSP430F247 is connected to a gate electrode of said FET via said first resistor; said gate electrode of said FET is connected to ground via said second resistor and a source electrode of said FET is also connected to ground; a drain electrode of said FET is connected to said buzzer; and said light indicating circuit comprises a LED light emitting diode, wherein an eighth pin P3.2/UCB0SOMI/UCA0SCL of said SCM MSP430F247 is connected to a cathode of said LED light emitting diode and an anode of the LED light emitting diode is connected to a power source terminal via a third resistor.

* * * * *